Nov. 9, 1965 C. L. BURNS 3,217,178

BI-STABLE CIRCUIT HAVING A MULTI-APERTURED MAGNETIC CORE AND A REGENERATIVE WINDING SUPPLIED THROUGH A TRANSISTOR

Filed June 11, 1962 3 Sheets-Sheet 1

INVENTOR:
Clence L. Burns

By Mueller & Aichele
Attorney

INVENTOR:
Clence L. Burns
By Mueller & Aichele
Attorney

BI-STABLE CIRCUIT HAVING A MULTI-APERTURED MAGNETIC CORE AND A REGENERATIVE WINDING SUPPLIED THROUGH A TRANSISTOR

Filed June 11, 1962

INVENTOR:
Clence L. Burns

By Mueller & Aichele
Attorney 3,217,178
Patented Nov. 9, 1965

3,217,178

BI-STABLE CIRCUIT HAVING A MULTI-APERTURED MAGNETIC CORE AND A REGENERATIVE WINDING SUPPLIED THROUGH A TRANSISTOR

Clence L. Burns, Phoenix, Ariz., assignor to Motorola, Inc., Chicago, Ill., a corporation of Illinois Filed June 11, 1962, Ser. No. 202,361
18 Claims. (Cl. 307—88.5)

The present invention relates to bi-stable circuits; and it relates more particularly to improved, magnetic core, transistorized bi-stable circuits for use in binary counters and the like.

The bi-stable circuits to be described herein utilize multi-apertured magnetic cores which are composed, for example, of ferrite material exhibiting essentially rectangular hysteresis loop characteristics. These cores, in conjunction with associated windings on the respective legs thereof and appropriate transistorized control circuitry, as will be described, provide circuits of desired bi-stable characteristics.

Binary counters, as is well known, find wide application in the electronic digital computer art, in electronic guidance systems, and in other electronic systems and related arts. Binary counters are used in electronic systems for timing purposes, and they also have general utility in many types of electronic equipment which utilize pulse signals. In such equipment, for example, the binary counter performs frequency division, synchronization, and other useful functions.

It is, accordingly, a general object of the present invention to provide an improved bi-stable circuit for use in a binary counter, and which has a simplified construction utilizing magnetic cores and associated transistorized logic and control circuitry.

A further object is to provide such an improved bi-stable circuit which exhibits a high degree of reliability, and which is capable of withstanding shocks and vibrations without affecting its electrical operating characteristics.

Yet another object is to provide such an improved bi-stable circuit which may be operated through a wide range of ambient temperatures without affecting its electrical operating characteristics.

Another object is to provide such an improved bi-stable circuit which exhibits non-destructive read-out capabilities so as to permit the circuit to be used not only for counting purposes, but as a register for storing binary coded information.

Yet another object is to provide such an improved bi-stable circuit which is capable of responding to completely random input pulses and which does not require external clocking.

Another object is to provide such an improved bi-stable circuit which is capable of performing its required function in an accurate, stable and reliable manner without the requirement for critical circuit parameters and constants, and with a minimum of component parts and simple associated circuitry.

A further object is to provide such an improved bi-stable circuit which is reliable in its operation, which is inexpensive and rugged in its construction, and which is compact in size and relatively light in weight.

Features of the bi-stable circuit of the present invention include the provision of a magnetic core circuit which is capable of responding to input pulses having a wide tolerance in pulse width and amplitude; which will tolerate power supply variations up to, for example, as much as ±50% without malfunction; and which is capable of operating in a wide range of ambient temperatures, of, for example, −40° centigrade to +70° centigrade.

The invention also has the feature of being suited for efficient modular fabrication techniques. This is because all the stages of the counter incorporating the bi-stable circuit of the invention may be identical.

The invention is also advantageous in that the improved bi-stable circuit of the invention may be constructed to consume relatively low power during its standby condition. Moreover, the circuit and system of the invention is so conceived that power failures do not affect the particular state in which the counter happens to be when such a power failure occurs.

Other features, objects and advantages of this invention will become apparent from a consideration of the following specification, when taken in conjunction with the accompanying drawings, in which.

Figures 1, 2A, 2B, 2C, 2D:
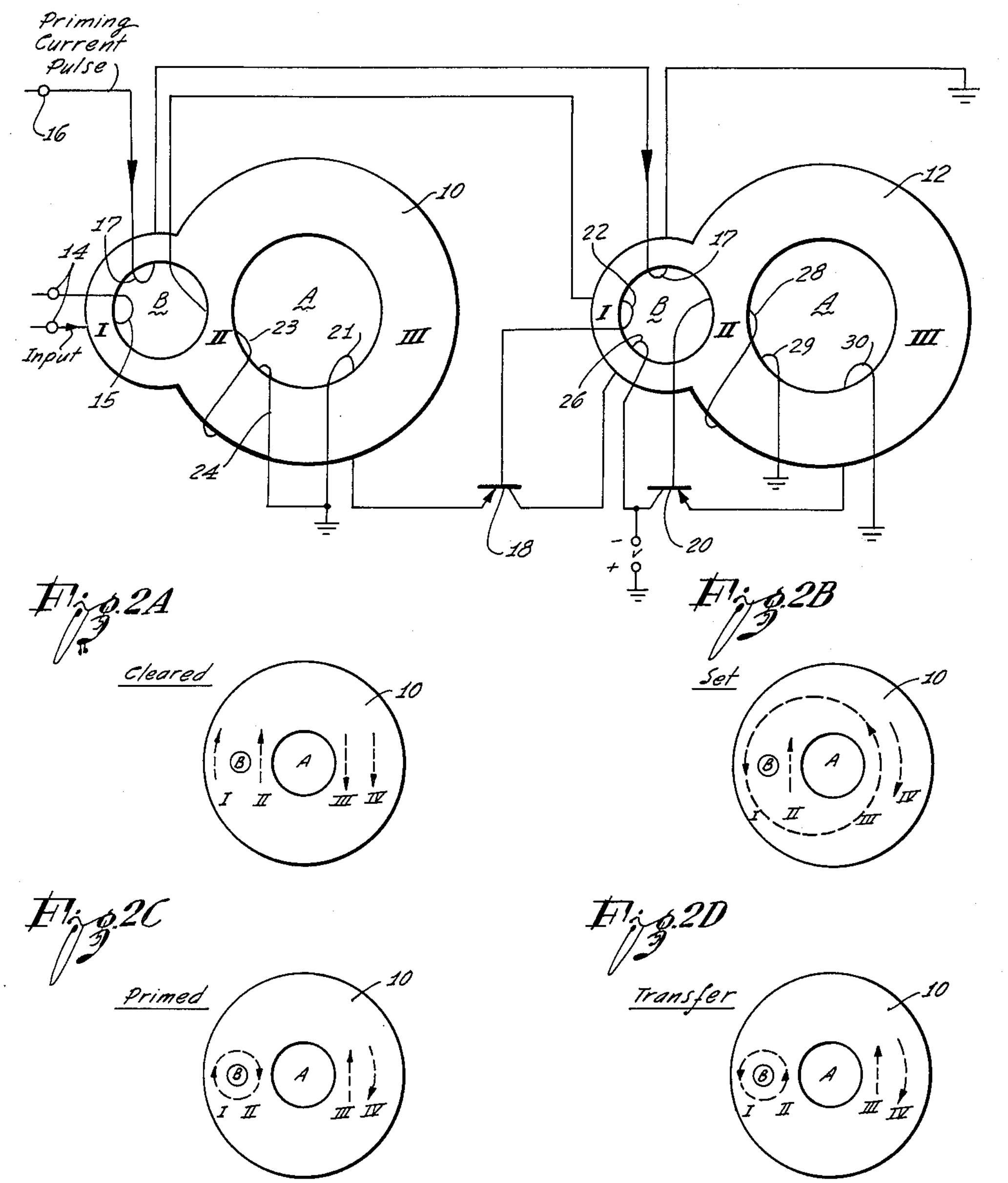
FIGURE 1 is a circuit diagram of a two-stage binary counter constructed to incorporate bi-stable circuits embodying the concepts of the present invention.
FIGURES 2A–2D are schematic core representations useful in explaining the operation of the circuit and system of the invention.

The two-stage binary counter of FIGURE 1 includes a first magnetic core 10 and a second magnetic core 12. These magnetic cores may be made of a suitable known magnetic ferrite material, for example, and they exhibit the usual rectangular hysteresis loop characteristics of such material. Each of the cores 10 and 12 is constructed to have a central aperture A and at least one additional auxiliary aperture B. These apertures define three legs I, II and III in each core.

The binary counter of FIGURE 1 includes a pair of input terminals 14 which are connected to a winding 15 which extends through the auxiliary aperture B of the core 10 around the leg I. The circuitry also includes an input terminal 16 which is connected to a winding 17 extending around the leg I and through the auxiliary aperture B of each of the cores 10 and 12. The winding 17 is connected to a point of reference potential, such as ground. This winding receives priming pulses from an appropriate pulse source, not shown.

The binary counter of FIGURE 1 also includes a pair of PNP transistors 18 and 20. The emitter of the transistor 18 is connected to a winding 21 which extends through the main aperture A of the core 10 and around the leg III. The other terminal of the winding 21 is grounded. The base of the transistor 18 is connected to a winding 22 which extends through the auxiliary aperture B and around the leg I of the core 12. The winding 22 serves as a feedback source for the transistor 18, as will be further described. The winding 22 is connected back to a winding 23 which extends around the leg II of the core 10. The winding 23, in turn, is connected to a winding 24 on the leg III of the core 10. The winding 24 is grounded.

The collector of the transistor 18 is connected to a winding 26 which extends around the leg I and through the aperture B of the core 12. The winding 26 serves as an input winding for the core 12, and it is connected to the negative terminal of a supply source "V" of direct current exciting potential. The positive terminal of the "V" is grounded.

The collector of the transistor 20 is also connected to the negative terminal of the source "V." The base of the transistor 20 is connected to a winding 28 which extends around the leg II of the core 12. The winding 28 is connected to a winding 29 on the leg III of the core 12, the winding 29 being grounded. The emitter of the transistor 20 is connected to a winding 30 which extends through the aperture A and around the leg III of the core 12, the other terminal of the winding 30 being grounded.

It will be appreciated that the binary counter of FIGURE 1 is extremely simple in its concept and construction, in that it requires but a single transistor and one magnetic core for each bi-stable stage.

In explaining the operation of the counter of FIGURE 1, reference is also made to the schematic representations of FIGURES 2A–2D. These latter representations show, by means of arrows, the core 10 in its various magnetic conditions, during each cycle of operation of the corresponding bi-stable stage of the binary counter.

When the binary counter is in the 0.0.0.0 . . . condition, all the cores are in the "cleared" state. When the core, such as the core 10, is in the "cleared" state, the core is saturated in a first particular direction with the flux extending in the direction represented by the arrows in FIGURE 2A. For that condition, the saturated flux in all three legs I, II and III of the core is such that the flux extends in a clockwise direction about the main aperture A.

Now, should a first input pulse be applied to the input winding 15 of the core 10 in FIGURE 1, by way of the input terminals 14, the resulting flux in the core links the leg I to reverse the flux in that leg. Since the magnetic flux in the core 10 must follow the closed path, the flux in the leg III adjacent also reverses, so as to create the "set" situation shown in FIGURE 2B. The flux in the leg II cannot reverse because that leg is already saturated in the counter-clockwise direction about the auxiliary aperture B.

This reversal of flux in the legs I and III of the core 10 links the windings 21 and 24 to generate a voltage across the transistor 18. This voltage has a polarity opposite to that required to drive the transistor to its conductive condition, so that the transisor remains in an original non-conducive condition.

At the termination of the input pulse applied to the input winding 15, a priming current pulse is introduced to the winding 17 by way of the input terminal 16. This priming pulse switches the flux in the leg I back to its original state, and also reverses the flux in the leg II. This switching of the flux in the core 10 by the priming pulse creates the "primed" condition shown in FIGURE 2C, in which the flux extends in a clockwise direction around the auxiliary aperture B, whereas the flux in the leg III is not affected. This latter switching of the flux by the priming pulse links with the winding 23 and causes it to generate a voltage which, again, is in the direction opposite to that required to cause conduction of the transistor 18. The transistor 18, therefore, is non-conductive in the "cleared" state of the core 10, and the transistor remains non-conductive for the "set" and "primed" states of the core.

The next input pulse applied to the input winding 15 again switches the flux in the leg I of the core 10. However, this time the flux in the leg II of the core 10 is in the direction such that it is also reversed, and the resulting flux in the core 10 extends in a counter-clockwise direction about the aperture B, as shown in the "transfer" condition of FIGURE 2D.

This "transfer" switching of the flux in the core 10 links the winding 21, and this time the resulting voltage induced across the winding 21 is in the direction to drive the transistor 18 to its conductive state.

The resulting current flow through the winding 21 switches the flux in the core 10 back to its original "cleared" state of FIGURE 2A. This latter flux switching links the winding 24, and the resulting voltage induced in the winding 24 drives the transistor 18 further 18 further into conduction. This regenerative action continues until the core 10 is completely saturated in its "cleared" condition of FIGURE 2A.

Therefore, a first input pulse applied to the input terminal 14 changes the magnetic condition of the core 10 from its "cleared" state of FIGURE 2A to its "set" state of FIGURE 2B. However, the transistor 18 remains in its non-conductive state while this transformation occurs. The second input pulse applied to the terminal 14, however, transforms the magnetic condition of the core 10 from the "primed" state of FIGURE 2C to the "transfer" state of FIGURE 2D. This latter transformation causes output signals to be developed which renders the transistor 18 conductive.

The resulting conductivity of the transistor 18 gives rise to a regenerative action which restores the core 10 to its "cleared" condition. The resulting conductivity of the transistor 18 also introduces a first input pulse to input winding 26 of the core 12. This causes the core 12 to assume its "set" condition. Therefore, the transistor 18 is set to its conductive condition by each second input pulse to provide a count of $2^1$ by the bi-stable circuit of the core 10, whereas the core 12 sets the transistor 20 conductive on a count expressed by $2^2$. Similarly, other bi-stable stages connected in the same manner in cascade with the illustrated stages of FIGURE 1, will produce the usual binary count of $2^3$, $2^4$, $2^5$ and so on.

Figure 3:
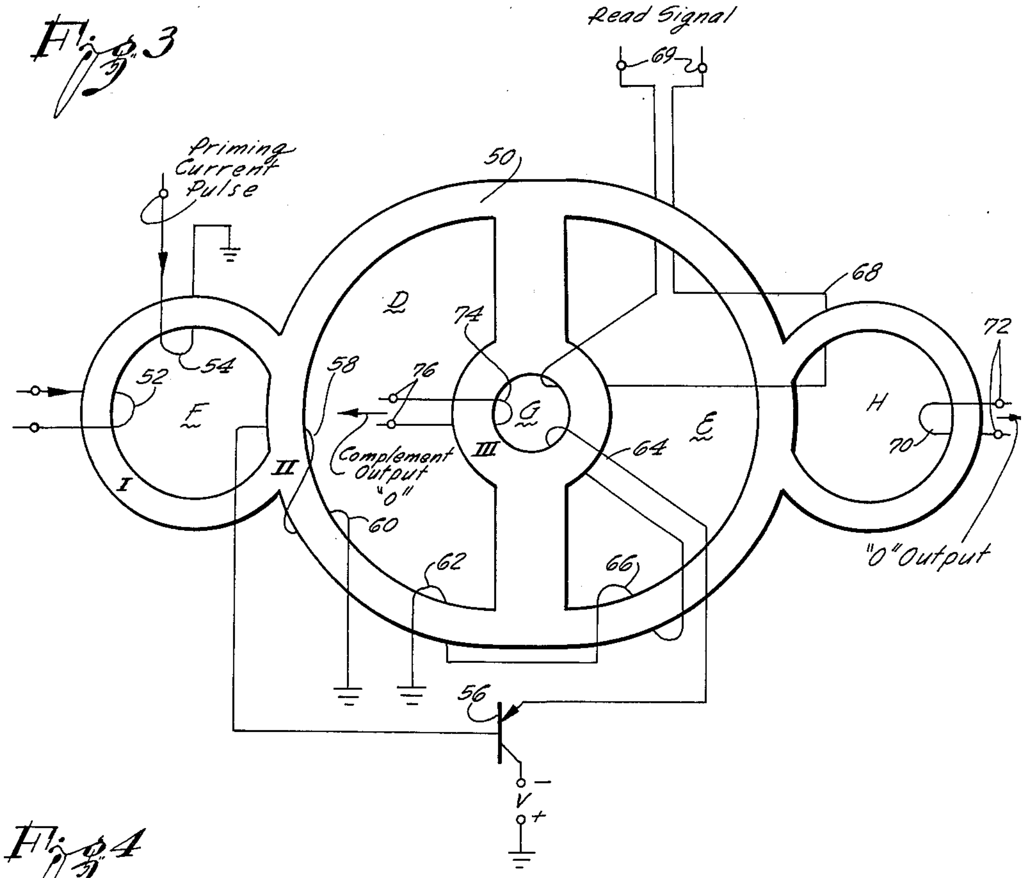
FIGURE 3 is a circuit diagram of a bi-stable circuit representing a modification of the invention which permits output signals and their complements to be derived in a simple and expeditious manner.

An output signal may be derived at any stage of the counter of FIGURE 1, for example, by replacing the cores, such as the cores 10 and 12 in FIGURE 1, with cores, such as the core 50 in FIGURE 3. The core 50 has a plurality of apertures designated D, E, F, G and H. The apertures D and E constitute main apertures in the core 50, and they are separated by a common leg having the aperture G therein. The apertures F and H are formed in end portions of the core 50.

The windings wound about the portions of the core 50 adjacent the apertures F and D are similar to those in the circuit of FIGURE 1. For example, an input winding 52 is wound through the aperture F about the leg I, as is a priming winding 54.

The circuit of FIGURE 3 includes a PNP transistor 56. The collector of the transistor 56 is connected to the negative terminal of the direct current supply voltage source "V." The base of the transistor 56 is connected to a winding 58 which extends around the leg II of the core 50 between the apertures F and D. As in the previous embodiments, the winding 58 is connected to a winding 60 on the leg III of the core 50. The latter winding extends through the aperture D, and it is grounded.

In the circuit of FIGURE 3, the emitter of the transistor 56 is connected to a winding 62 on the leg III by way of control windings 64 and 66. The control winding 64 extends through the aperture G, and the control winding 66 extends through the aperture E.

A read-out signal is applied by way of terminals 69 to a read-out winding 68 which extends into the apertures H and G. A first output winding 70 extends into the aperture H and the output signal "0" is derived across the output terminals 72 connected to that output winding when the core is in its "set" or "1" state. A second output winding 74 extends into the aperture G, and the complement output signal "$\bar{0}$" is derived across the output terminals 76 of the latter output winding when the core is in its "cleared" or "0" state.

The windings 52, 54, 58, 60 and 62 of the bi-stable circuit of FIGURE 3 operate in the manner of the corresponding windings of the bi-stable circuit of FIGURE 1 to establish the left hand portion of the core 50 successively in the "cleared," "set," "primed," "transfer" condition, in response to input and priming pulses, as described above. When transistor 56 conducts during the "transfer" condition, current flows through control windings 64 and 66 to reverse the flux around apertures G and E respectively.

When an input pulse applied to the winding 52 causes the core 50 to be triggered to its "set" state in the manner described above in conjunction with FIGURE 1; the direction of the flux in leg III is switched, as shown in FIGURE 2B. The core 50 is now in its "set" or "1" state.

The switching of the flux in the leg III by the setting of the core 50 to its "set" state is such that a read signal applied to the terminals 69 and which flows in the read-out winding 68 causes a reversal of the flux around the aperture "H," but has no effect on the flux around the aperture "G." This reversal of the flux around the aperture H produces an output "0" at the output terminals 72, indicative that the core 50 had previously been set to its "set," "1" or "true" state.

However, when the core 50 is in its "cleared" or "0" state, and as shown in FIGURE 2A, the direction of flux in leg III and around the aperture "G" is such that the read-out signal applied to the terminals 69 produces a reversal of the flux around the aperture "G" but no reversal around the aperture "H." The flux reversal around the aperture "G" produces an output "$\overline{0}$" at the output terminals 76, indicative that the core 50 is in its "0" or "false" state.

It is apparent that the bi-stable circuit of the core 50 may be utilized in each of the stages of the binary counter constructed in accordance with the concepts of FIGURE 1, so that an output signal "0" or its complement "$\overline{0}$" may be derived from each stage by a corresponding read-out operation. In some applications, however, an output signal is required only at the final stage of the counter, so that the bi-stable circuit of the core 50 need be included only in the final stage of the counter for the latter requirements.

Figure 4:
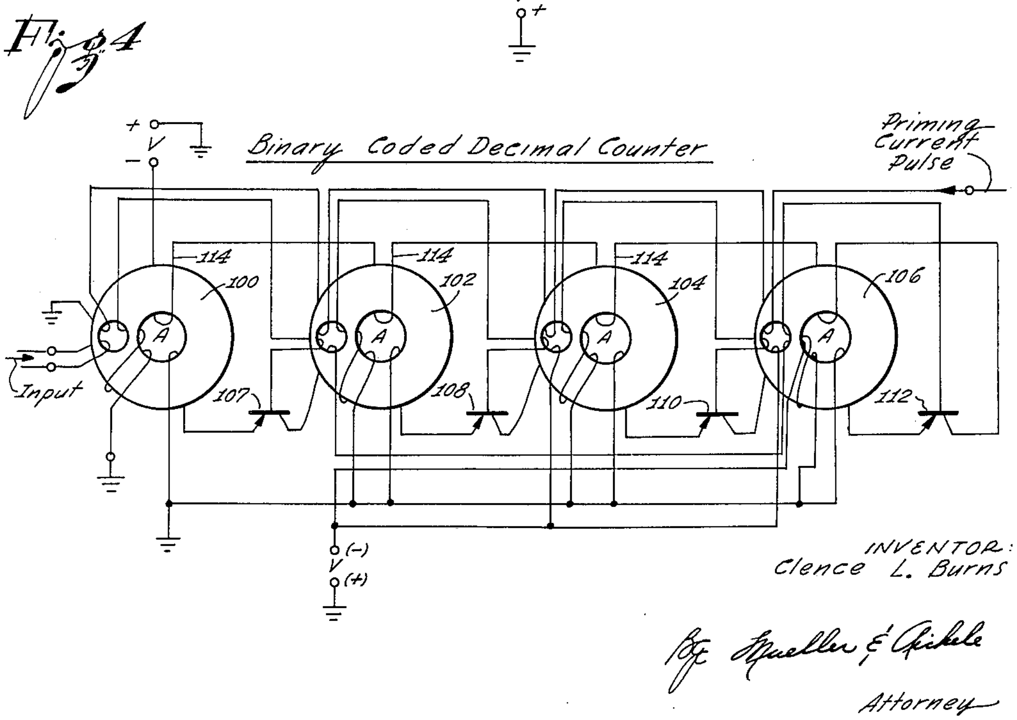
FIGURE 4 is a binary-coded decimal counter incorporating bi-stable circuits which, in turn, embody the principles and concepts of the invention.

The binary counter incorporating the bi-stable circuits of the present invention can be connected as a binary coded decimal counter as shown, for example, in the circuit of FIGURE 4. This latter counter includes four magnetic cores designated 100, 102, 104 and 106. The connections of the counter of FIGURE 4 are similar to those described in conjunction with FIGURE 1, and each stage includes an associated transistor, such as respective ones of the transistors 107, 108, 110 and 112. In the circuit of FIGURE 4, however, the collector of the transistor 112 in the final stage, instead of being connected directly to the negative terminal of the source "V" of supply voltage, is connected to that terminal through a winding 114. The winding 114 extends through the main aperture A of each of the cores 100, 102, 104 and 106, and its other side is connected to the negative terminal.

With the connection to the winding 114, the transistor 112 returns all the cores to the cleared condition after the final stage of the counter has been cleared. Therefore, the counter of FIGURE 4 is controlled to return to its 0000 state, after it has assumed a binary coded state corresponding to the decimal digit 9. In this manner, the counter of FIGURE 4, cyclically produces successive output signals corresponding respectively to the successive decimal digits 0–9.

Figure 5:
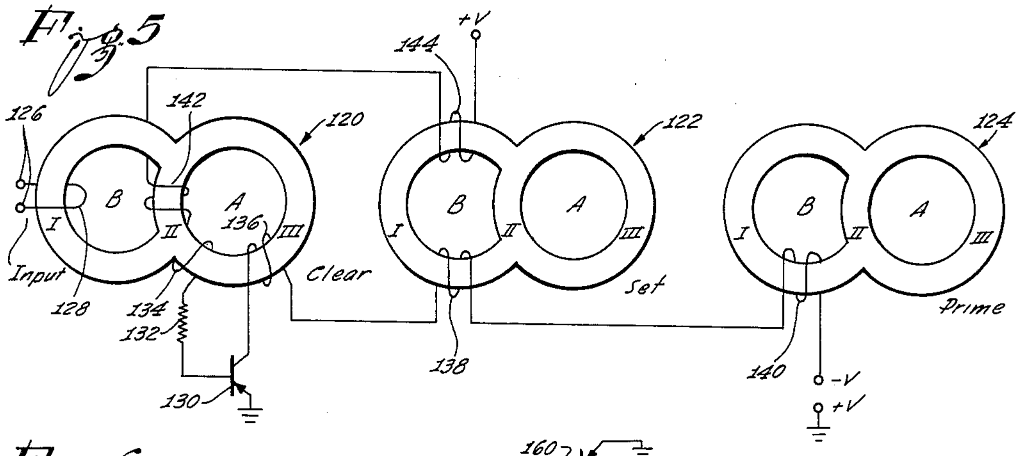
FIGURE 5 is a fragmentary circuit diagram of a modification of the invention in which the bi-stable circuits in a binary counter employ self-priming means rather than separate priming means.
Figure 8:
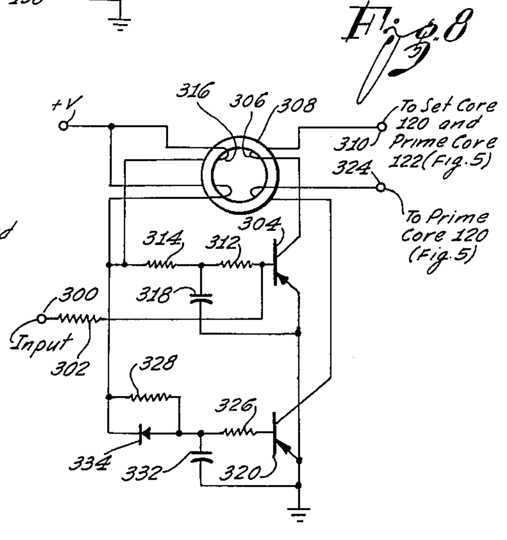
FIGURE 8 is an external priming circuit for the first two stages of the counter of FIGURE 5.

The counter shown in FIGURE 5 in fragmentary form represents a modification of the counter of FIGURE 1, this modification exhibiting self-priming characteristics. The circuit of FIGURE 5 includes, for example, three magnetic cores 120, 122 and 124. Each of these cores has a main aperture A, and each has an auxiliary aperture B. The first two stages of the counter are primed by an external circuit. This circuit produces a double pulse for each individual input pulse. This circuit is illustrated in FIGURE 8, and will be described hereinafter.

The self-priming counter of FIGURE 5 includes a pair of input terminals 126 which are connected to an input winding 128 extending around the leg I and into the aperture B of the core 120. A PNP transistor 130 has its base connected through a resistor 132 to a winding 134. The winding 134 is wound on the leg III of the core 120 and it extends into the aperture A of the core. The emitter of the transistor 130 is grounded, and its collector is connected to a multiple turn winding 136 which is also wound on the leg III of the core 120, and which also extends into the aperture A of the core.

The other side of the winding 136 is connected to a multiple-turn winding 138 on the leg I of the core 122, and which extends into the aperture B of the core. This latter winding is connected to a multiple-turn winding 140 on the leg I of the core 124, and which extends into the aperture B of the core. The other side of the winding 140 is connected to the negative terminal of the source "V."

The winding 134 on the leg III of the core 120 is connected to a multiple-turn winding 142, the winding 142 being wound around the common leg II of the core 120 between the apertures A and B. The winding 142 is connected to a multiple-turn winding 144 on the leg I of the core 122, the other side of which is connected to the positive terminal of the source "V."

The counter of FIGURE 1 uses separate priming pulses from a separate priming pulse source of the core 10 or 12 (FIGURE 2C) between the first and second input pulses. In the embodiment of FIGURE 5, the current from a preceding counter stage is used to provide this priming pulse reversal in any subsequent stage in the counter.

The three counter stages shown in FIGURE 5 have the driver circuits omitted from the second and third stages for purposes of clarity. It will be appreciated that the cores 122 and 124 may incorporate driver circuits similar to those in conjunction with the core 120.

In the operation of the circuit of FIGURE 5, and when the core 120 is set to the "transfer" condition, the transistor 130 is triggered into conduction as in the previous embodiment. In the circuit of FIGURE 5, the resulting collector current of the transistor 130 flows through the windings 136, 138 and 140. The current through the winding 136 "clears" the core 120; the current through the winding 138 "sets" the core 122 of the next stage; and the current through the winding 140 "primes" the core 124 of the following stage.

As noted above, transistorized driver circuits, similar to the circuit of the transistor 130, are also provided for the cores 122 and 124. The collector of each of the transistors in these latter circuits is connected to windings on the three cores 120, 122 and 124 in a manner similar to the connection of the collector of the illustrated driver transistor 130 to the windings 136, 138 and 140. For example, the driver transistor for the core 122 serves to "clear" the core 122, to "set" the core 124 and to "prime" a succeeding core (not shown). Likewise, the driver transistor for the core 124 serves to "clear" the core 124, and to "set" and "prime" succeeding cores (not shown). Of course, the resulting counter is not limited to three stages, but the chain of three may be continued as long as desired.

The windings 142 and 144 on the cores 120 and 122 provide the desired feedback to maintain the transistor 130 conductive during the clearing of the core 120, and the setting of the core 122. Similar feedback windings are provided in the transistorized driver circuits of the cores 122 and 124 (not shown).

The number of turns of the windings 136, 138 and 140 are all different so that the three cores will be switched individually, rather than simultaneously. The winding 136 has the most turns so that the first function performed when the transistor 130 is triggered conductive is to "clear" the core 120. The winding 138 has the next most turns, so that after the core 120 is "cleared," the core 122 is then "set." The winding 124 has the least number of turns, so that the core 124 is "primed" last, and after the core 120 is "cleared" and the core 122 is "set."

When the driver transistor 130 is triggered to its conductive state, the collector current in the transistor rises until it is limited by the switching inductance of the winding 136 associated with the core 120. After the flux in the core 120 has been switched to "clear" the core, the inductance of the winding 136 drops. This causes the collector current in the transistor 130 again to rise until it is limited by the inductance of the winding 138 associated with the core 122. After the winding 138 has performed its flux switching action to "set" the core 122, its inductance drops. The collector current of the transistor 130 now again rises until it is limited by the inductance of the winding 140 associated with the core 124. This now permits the winding 140 to perform its flux switching action to "prime" the core 124. Therefore, by the proper choice of the turns of the different coils 136, 138 and 140 the desired time sequence of the flux switching operations in the three cores can be achieved. This permits, in each instance, the core of the lesser significant bit to be cleared before the driver transistor associated with the next core is triggered to its conductive state.

The system of FIGURE 5 provides a further simplification to the pulse counter circuitry of the present invention, as compared with the circuit of FIGURE 1. The circuit of FIGURE 5 removes the requirement for separate priming pulses except for the first two stages, and for the separate pulse generator required to generate the pulses.

As noted above, an appropriate circuit for setting and priming the first two stages of the counter of FIGURE 5 is shown in FIGURE 8.

The circuit of FIGURE 8 includes an input terminal 300 which receives the input pulses applied to the counter of FIGURE 5. The input terminal 300 is connected through a resistor 302 to the base of a PNP transistor 304.

The collector of the transistor 304 is connected through a winding 306 on a core 308 to an output terminal 310. The output terminal 310 supplies output pulses to set the core 120 and to prime the core 122 of FIGURE 5, suitable windings being provided on the cores and connected to the output terminal for that purpose.

The base of the transistor is further connected through a pair of resistors 312 and 314, and through a winding 316 on the core 308, to the positive terminal of the source of biasing voltage V.

The emitter of the transistor 304 is grounded. The common junction of the resistors 312 and 314 is connected to a grounded capacitor 318.

The circuit of FIGURE 8 also includes a second PNP transistor 320. The collector of the transistor 320 is connected through a winding 322 on the core 308 to a second output terminal 324. The output terminal 324 supplies output pulses to prime the core 120 in FIGURE 5; a suitable winding being provided on the core and connected to the output terminal for that purpose.

The emitter of the transistor 320 is grounded. The base of the transistor is connected through a pair of resistors 326 and 328, and through a winding 330 on the core 308 to the positive terminal of the source V.

The junction of the resistors 326 and 328 is connected to a grounded capacitor 332. The resistor 328 is shunted by a diode 334.

When an input pulse is introduced to the terminal 300, the pulse will cause the transistor 304 to become conductive. The circuit associated with the transistor 304 provides regenerative feedback for the transistor. The resulting current through the windings 306 and 316 causes the magnetic flux in the core 308, which core has the usual square-loop hysteresis characteristics, to be switched in the counter-clockwise direction.

The collector current from the transistor 304 is used to set the first stage of the counter of FIGURE 5 and to prime the second stage of the counter.

At the termination of the conductive cycle of the transistor 304, the resulting flyback voltage induced in the windings 322 and 330 cause the transistor 320 to become conductive. The latter transistor circuit also provides regenerative feedback which causes the transistor 320 to switch the flux in the core 308 in the clockwise direction. The collector current of the transistor 320 is used to prime the core 120 of FIGURE 5.

The stored charge in the capacitor 332 causes the collector current of the transistor 320 to decay at a sufficiently slow rate that the transistor 304 is not again rendered conductive at the termination of the conductive cycle of the transistor 320.

Figure 6:
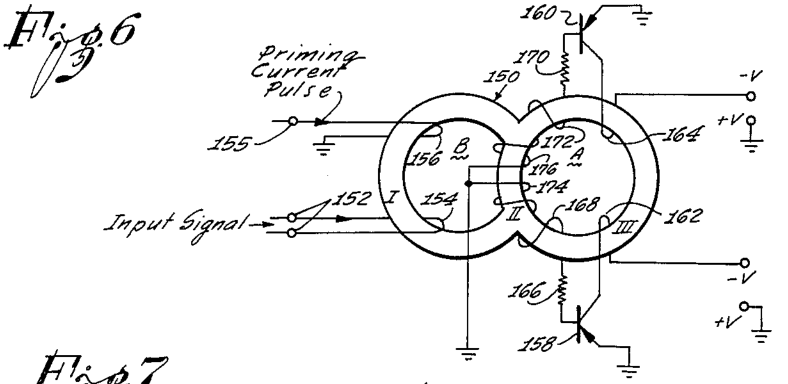
FIGURE 6 is a further modification of the bi-stable circuit of the invention in which redundant circuitry in provided to decrease the likelihood of malfunction.

The circuit of FIGURE 6 represents a bi-stable stage similar in some respects to the bi-stable stages of the counter of FIGURE 1. However, in the circuit of FIGURE 6, duplicate circuits are provided to improve the reliability of the system. It is to be understood, of course, that similar duplicate circuits, in accordance with this latter embodiment, may be substituted for each of the stages of the counter.

The bi-stable circuit of FIGURE 6 includes a core 150 having a main aperture A and an auxiliary aperture B. As in the previous embodiments, an input signal is applied across a pair of input terminals 152 which are connected to a winding 154 on the leg I and which extends into the aperture B. The priming current pulse is applied by way of an input terminal 155 to a winding 156 which, likewise, is wound on the leg I and extends into the aperture B.

The bi-stable circuit of FIGURE 6 includes a first PNP transistor 158 and a second PNP transistor 160. The emitters of both transistors 158 and 160 are grounded. The collector of the transistor 158 is connected to a winding 162 on the leg III which, in turn, is connected to the negative terminal of the source "V." The collector of the transistor 160 is connected to a winding 164 which, likewise, is wound on the leg III and which also is connected to the negative terminal of the source "V."

The base of the transistor 158 is connected through a resistor 166 to a winding 168 on the leg III, and the base of the transistor 160 is connected through a resistor 170 to a winding 172 on the leg III. The windings 162, 164, 168 and 172 all extend into the aperture A of the core 150.

The winding 168 is connected to a winding 174 on the leg II, and the winding 172 is connected to a winding 176 on the leg II. The windings 174 and 176 both extend around the common leg II of the core between the apertures A and B, as noted, and both of these windings are grounded.

The circuitry of the transistors 158 and 160 provide a redundant transistorized driver circuit. The circuit includes two distinct and separate networks, each of which operate in the manner described above. The circuit of FIGURE 6 is such that either transistor 158 or 160 may fail in either mode of the bi-stable circuit without disturbing the operation thereof. As noted above, the use of the redundant circuitry improves the reliability of the counter.

The operation of the bi-stable circuit of FIGURE 6 is the same as if one transistor were used, as in the circuit of FIGURE 1, instead of two. However, the collector current now divides between the transistors 158 and 160. The base-to-emitter short circuit in either transistor will not affect the operations, because the current in the associated windings is limited, in each instance, by the corresponding one of the series resistors 166 or 170. Should an open circuit condition occur in either of the transistor circuits, the over-all stage will continue to operate undisturbed with the remaining transistor circuit.

Figure 7:
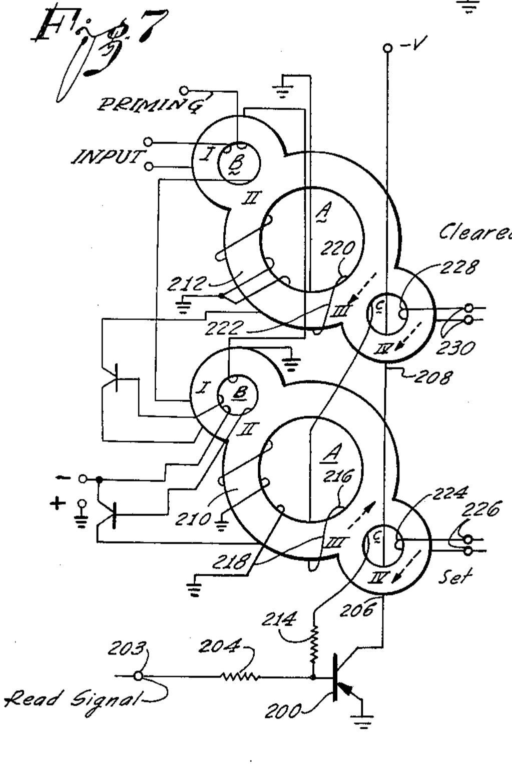
FIGURE 7 is a fragmentary circuit diagram illustrating appropriate read-out circuitry for the circuit and system of the invention.

An appropriate read-out circuit for the bi-stable circuits of the invention is shown in FIGURE 7. The read-out circuit, as will be described, is capable of providing a read-out control for a plurality of cores, although only two are shown in FIGURE 7 for purposes of explanation.

The read-out circuit to be described is regenerative and it includes a transistor which is driven to a saturated state when it is conductive. The transistor functions, therefore, as a voltage source rather than a usual high-impedance current source. The read-out circuit has the advantage of being self-regulating because the state of the cores are the determining factor in the current flow through the read-out circuit. Therefore, the coercive force of the cores can change with temperature without adversely affecting the operation of the read-out circuit.

The usual read-out circuit merely provides a direct current flow through a read-out winding to switch the flux in the "set" cores and thereby produce an output in the corresponding output windings. The read-out circuit of FIGURE 7 is advantageous over the prior art circuits since its power requirements are lower because there is no series resistance in the circuit during read-out as is the case in the usual prior art systems. This latter factor also tends to higher read-out speeds in the system of FIGURE 7.

Another advantage of the read-out circuit of FIGURE 7, as compared to the usual prior art read-out circuits is that it exhibits increased stability and reliability and also in that it uses fewer component parts. In addition, the read-out circuit of FIGURE 7 is capable of producing a higher amplitude output as compared with the prior art circuits.

A pair of magnetic cores 210 and 212 are illustrated in FIGURE 7. These cores may be similar to the cores 10 and 12 in FIGURE 1, except that they are each provided with an output aperture C and a fourth leg IV.

The circuit of FIGURE 7 includes a transistor 200 of the PNP type and having its emitter grounded. The collector of the transistor 200 is connected to a winding 206 which, in turn, is connected to a winding 208. The winding 206 is wound on the leg IV of the core 210 and the winding 208 is wound on the leg IV of the core 212. The winding 208 is connected to the negative terminal of the source "V."

The read-out circuit includes an input terminal 203 which receives the pulse-type read-out signal. The terminal 203 is connected to a resistor 204 which, in turn, is connected to the base of the transistor 200.

The base of the transistor 200 is also connected through a resistor 214 to a winding 216 wound on the leg III of the core 210. The winding 216 is connected to a control winding 218 on the leg II of the core 210 which, in turn, is connected to a winding 220 on the leg III of the core 212. The winding 220 is connected to a control winding 222 on the leg II of the core 212; the other terminal of the winding 222 being connected to a point of reference potential, such as ground.

An output winding 224 is wound on the leg IV of the core 210, and the output winding is connected to output terminals 226. An output winding 228 is wound on the leg IV of the core 212, and the latter output winding is connected to output terminals 230.

As shown in FIGURE 7, other windings like the windings of the bi-stable circuit of FIGURE 1, are also associated with the cores 210 and 212. For purposes of explanation, it will be assumed that the bi-stable circuit windings have established the core 210 in its "set" or "1" condition, and have established the core 212 in its "cleared" or "0" condition.

The introduction of a read-out pulse to the terminal 203 drives the transistor 200 conductive. The resulting current flow through the winding 206 switches the flux around the output aperture "C" in the core 210. The resulting reversal of flux in the leg III of the core 210 induces a voltage in the winding 216 of such polarity to create regeneration in the transistor 200, so that the transistor will continue to conduct until all the flux is reversed around the aperture "C." This flux reversal results in an output voltage being induced in the output winding 224. The resulting output across the terminals 226 indicates that the core 210 had been established in its "set" or "1" state.

The polarity of the winding 218 is opposite to that of the winding 216 to prevent any flux switching around the aperture "A" of the core 210. The transistor remains saturated so long as the switched flux around the aperture C of the core 210 induces a regenerative voltage in the winding 216, and it then becomes non-conductive. The transistor acts, therefore, as a voltage source during the flux switching.

In the example of FIGURE 7, the core 212 is assumed to be in the "cleared" or "zero" state. Therefore, any tendency for the winding 208 to reverse the flux in the leg IV of that core has no effect on the flux in leg III, because the latter flux is already reversed and the flux switching path must extend around the aperture "A" of the core 212. The current in the winding opposes any flux switching around the aperture "A." This prevents the current in the winding 208 from reversing the flux in the leg IV of the core 212. This means that no voltage is induced across the winding 228 and no output is produced at the terminals 230. This is desired because the core 212 is assumed to be in its "cleared" or "0" state.

The invention provides, therefore, an improved bi-stable circuit which requires as its active components a magnetic core and a single transistor. The bi-stable circuit of the invention has been found to operate with stability and accuracy to for ma most reliable counter system and the like.

While particular embodiments of the invention have been shown and described, modifications may be made. The following claims are intended to cover all modifications falling within the scope of the invention.

What is claimed is:

1. A bi-stable circuit including in combination: a magnetic core having a particular original magnetic state and exhibiting essentially rectangular hysteresis loop characteristics, said core being apertured to form a first leg, a second leg and a third leg; an input winding and a priing winding wound on said first leg; a first output winding wound on said third leg and a regenerative winding wound on said third leg; a semiconductor device having an input electrode connected to said output winding and having a common electrode connected to said regenerating winding; first means for applying a first input pulse to said input winding to reverse the flux in said first and third legs of said core from the original magnetic state thereof and thereby to induce a signal in said first output winding of a polarity to maintain said semiconductor device in a state of non-conductivity; second means for applying a priming pulse to said priming winding means to reverse the flux in said first and second legs and thereby to induce a signal in said first output winding of a polarity to maintain said semiconductor device in said state of non-conductivity; said first means serving to apply a second input pulse to said input winding to reverse again the flux in said first and second legs of said core and thereby to induce a signal in said first output winding of a polarity to set said semiconductor device to a state of conductivity, the state of conductivity of said semiconductor device producing a current in said regenerative winding thereby to reverse the flux in said first and third legs of said core so as to return said core to its original magnetic state.

2. The bi-stable circuit defined in claim 1 in which said semiconductor device includes an emitter electrode constituting said input electrode and a base electrode constituting said common electrode, the emitter electrode of said semiconductor device being connected to said output winding, and the base electrode of said semiconductor device is connected to said regenerative winding.

3. The bi-stable circuit defined in claim 2 in which said semiconductor device includes a collector electrode, and which includes output circuit means connected to said collector electrode and to a source of supply voltage.

4. The bi-stable circuit defined in claim 1 in which said magnetic core has at least one further leg, a control winding wound on said further leg and connected to said semiconductor device for switching the flux in said further leg when said semiconductor device is set to said state of conductivity, a second output winding wound on said further leg, and a read-out winding wound on said further leg and responsive to an applied read signal for returning the magnetic flux in said further leg to its original magnetic state after a switching of the flux by said control winding, and thereby to induce an output signal in said second output winding.

5. The bi-stable circuit defined in claim 1 in which said magnetic core has a pair of further legs, second and third output windings wound on respective ones of said further legs of said core for respectively providing an output signal and the complement of such output signal; a pair of control windings wound on respective ones of said further legs and connected to said semiconductor device for switching the flux in said further legs from a first state to a second state when said semiconductor device is triggered to its state of conductivity; and a pair of read-out windings wound on said further legs and responsive to an applied read signal for switching the magnetic flux in one of said further legs when said further legs are in said second state so as to induce a signal in said second output winding, and for switching the flux in a second of said further legs when said further legs are in said first state so as to induce a signal in said third output winding.

6. A bi-stable circuit including in combination: a magnetic core having a plurality of apertures therein defining a plurality of core portions; input winding means wound on a first portion of said core; further winding means wound on a second portion of said core; an electronic discharge device having an input electrode connected to said further winding means; means for applying successive input signals to said input winding means to switch the magnetic flux in said second portion of said core so as to induce signals in said further winding means and thereby control the conductivity of said discharge device; a control winding wound on a third portion of said core and connected to said discharge device for switching the magnetic flux in said third portion of said core when said discharge device is triggered from one conductive state to another; an output winding wound on said third portion of said core; and a read-out winding wound on said third portion and responsive to an applied read signal for returning the magnetic flux in said third portion to its original state after a switching thereof by said control winding to thereby induce an output signal in said output winding.

7. A bi-stable circuit including in combination: a magnetic core having a plurality of apertures therein defining a plurality of core portions; input winding means wound on a first portion of said core; further winding means wound on a second portion of said core; an electronic discharge device having an input electrode connected to said further winding means; means for applying successive input signals to said input winding means to switch the magnetic flux in said second portion of said core in a manner to induce signals in said further winding means and thereby control the conductivity of said discharge device; first and second output windings wound on respective further portions of said core for respectively providing an output signal and the complement thereof; first and second control windings wound on said further portions of said core and connected to said discharge device for switching the magnetic flux in said further portions from a first state to a second state when said discharge device is triggered from one conductive state to another; and first and second read-out windings wound on said further portions respectively and responsive to an applied read signal for switching the magnetic flux in one of said further portions when said further portions are in said second state so as to induce an output signal in one of said output windings, and for switching the magnetic flux in the other of said further portions when said further portions are in said first state so as to induce an output signal in the other of said output windings.

8. In combination: a magnetic core having a plurality of apertures defining a plurality of core portions; first and second output windings wound on first and second portions of said core for respectively producing an output signal and the complement thereof; first and second control windings wound on said first and second portions of said core respectively and responsive to an applied signal for switching the magnetic flux in said first and second portions from a first state to a second state; and first and second read-out windings wound on said first and second portions on said core respectively and responsive to an applied signal for switching the magnetic flux in one of said first and second portions when said portions are in said second state so as to induce an output signal in one of said output windings, and for switching the magnetic flux in the other of said portions when said portions are in said first state so as to induce an output signal in the other of said output windings.

9. A binary counter including in combination: a plurality of bi-stable circuits, each of said bi-stable circuits including, a magnetic core exhibiting essentially rectangular hysteresis loop characteristics and apertured to define at least a first portion and a second portion; input winding means wound on said first portion of said core; output winding means and regenerative winding means wound on said second portion of said core; an electronic discharge device having an input electrode connected to said output winding means, a common electrode connected to said regenerative winding means, and an output electrode; and circuit means connecting the output electrode of the discharge device of each of said bi-stable circuits to the input winding means of the next succeeding one of the bi-stable circuits to apply successive input signals to said last-named input winding means successively to set the magnetic core thereof to a first magnetic state and to clear the core to a second magnetic state so as to induce a signal in said further winding means of said next succeeding bi-stable circuit and render the discharge device thereof conductive each time its core is cleared to said second magnetic state.

10. A binary counter including in combination: a plurality of bi-stable circuits each including, a magnetic core exhibiting substantially rectangular hysteresis loop characteristics; input winding means, output winding means and regenerative winding means wound on said core of the first bistable circuit; series-connected input windings respectively wound on the magnetic cores of successive ones of said bi-stable circuits for controlling the magnetic state of the magnetic cores therein; and said first bi-stable circuit including an electronic discharge device having input and common electrodes connected to said output and regenerative windings respectively, and an output electrode connected to the series-connected input windings of succeeding ones of the bi-state circuits to control the magnetic states of the cores therein in accordance with a predetermined pattern.

11. The binary counter of claim 10 in which said series-connected input windings have different numbers of turns with respect to one another to provide a successive control of the magnetic states of the ones of said magnetic cores corresponding thereto.

12. A bi-stable circuit including in combination: a magnetic core exhibiting essentially rectangular hysteresis loop characteristics and apertured to define first, second, third and fourth portions; input winding means wound on said first portion of said core; further winding means wound on said second portion of said core; an electronic discharge device having an input electrode connected to said further winding means; means for applying successive input signals to said input winding means to switch the magnetic flux in said core to set said core to a first magnetic state and to clear said core to a second magnetic state successively, so as to induce a signal in said further winding means each time said core is cleared to said second magnetic state and thereby render said discharge device conductive; an output winding wound on said fourth portion of said core; and read-out control circuit means including a read-out winding wound on said fourth portion of said core for switching the magnetic flux therein when said core is set to said first magnetic state and thereby to induce an output signal in said output winding.

13. The combination defined in claim 12 in which said read-out control circuit includes a second electronic discharge device, and in which said read-out control circuit includes a regenerative winding wound on said third portion of said core and connected to said second discharge device for maintaining said second discharge device conductive during the magnetic flux switching in said fourth portion of said core.

14. The combination defined in claim 13 and which includes a further control winding wound on said second portion of said core and connected to said second discharge device for preventing flux switching in said second portion of said core by conductivity of said second discharge device.

15. A bi-stable circuit including in combination: a magnetic core exhibiting essentially rectangular hysteresis loop characteristics; circuit means including winding means on said core for switching the magnetic flux in said core to set said core to a first magnetic state and to clear said core to a second magnetic state; an output winding wound on said core; and read-out control circuit means including a read-out winding wound on said core for switching the magnetic flux in a portion of said core when the core is set to said first magnetic state and thereby induce an output signal in said output winding, said read-out control circuit further including an electronic discharge device and a regenerative winding wound on said core and connected to said discharge device for maintaining said discharge device conductive during the flux switching in said portion of said core.

16. The combination defined in claim 15 and which includes a further control winding wound on a second portion of said core and connected to said discharge device for preventing flux switching in said second portion of said core by the conductivity of said discharge device.

17. A bi-stable circuit including in combination: a magnetic core having a particular original magnetic state and exhibiting essentially rectangular hysteresis loop characteristics, said core being apertured to form a first leg, a second leg and a third leg; an input winding and a priming winding wound on said first leg of said core, regenerative windings respectively wound on said second and third legs of said core, and an output winding wound on said third leg of said core; a semiconductor device having an input electrode connected to said output winding, and an electrode connected to said regenerative windings; first means for applying a first input pulse to said input winding to reverse the flux in said first and third legs from the original magnetic state thereof and thereby induce a signal in said output winding of a polarity to maintain said semiconductive device in a first state of conductivity; second means for applying a priming pulse to said priming winding to reverse the flux in said first and second legs of said core and thereby induce a signal in said output winding of a polarity to maintain said semiconductor device in said first state of conductivity; and said first means serving to apply a second input pulse to said input winding to reverse again the flux in said first and second legs and thereby to induce a signal in said output winding of a polarity to set said semiconductor device to a second state of conductivity, with signal flow through said regenerative windings maintaining said semiconductor device in said second state of conductivity and returning said core to its original magnetic state when said semiconductor device is in its second state of conductivity.

18. A bi-stable circuit including in combination: a magnetic core having a particular original magnetic state and exhibiting essentially rectangular hysteresis loop characteristics, said core being apertured to form a first leg, a second leg and a third leg: an input winding and a priming winding wound on said first leg of said core, and an output winding and a regenerative winding wound on said third leg of said core; a semiconductor device having an input electrode and a common electrode, with said input electrode connected to said output winding and said common electrode connected to said regenerative winding; first means for applying a first input pulse to said input winding to reverse the flux in said first and third legs from the original magnetic state thereof and thereby induce a signal in said output winding of a polarity to maintain said semiconductor device in a first state of conductivity; second means for applying a priming pulse to said priming winding to reverse the flux in said first and second legs of said core and thereby induce a signal in said output winding of a polarity to maintain said semiconductor device in said first state of conductivity; and said first means serving to apply a second input pulse to said input winding to reverse again the flux in said first and second legs and thereby to induce a signal in said output winding of a polarity to set said semiconductor device to a second state of conductivity, with said regenerative winding providing current for increasing the conductivity in said semiconductor device and the current flow through said output winding and said regenerative winding returning said core to its original magnetic state.

References Cited by the Examiner

UNITED STATES PATENTS

| | | | |
|---|---|---|---|
| 2,894,250 | 7/59 | Rochelle et al. | 307—88.5 |
| 3,044,044 | 7/62 | Lee | 307—88.5 |
| 3,096,509 | 7/63 | Rosenberg et al. | 340—174 |
| 3,114,896 | 12/63 | Carey | 307—88.5 |

FOREIGN PATENTS

| | | |
|---|---|---|
| 1,112,111 | 8/61 | Germany. |

OTHER REFERENCES

"Transistor Coupled Magnetic Shift Register," by Yu and Miller, RCA TN No. 397, June 10, 1960.

JOHN W. HUCKERT, *Primary Examiner.*

ARTHUR GAUSS, *Examiner.*